United States Patent [19]

Bates

[11] Patent Number: 4,927,384
[45] Date of Patent: May 22, 1990

[54] FLAT WIRE TO ROUND WIRE ELECTRICAL INTERCONNECT

[75] Inventor: Reginald A. Bates, Kernersville, N.C.

[73] Assignee: AMP Incorporated, Harrisburg, Pa.

[21] Appl. No.: 339,900

[22] Filed: Apr. 17, 1989

Related U.S. Application Data

[63] Continuation of Ser. No. 898,969, Aug. 21, 1986, abandoned.

[51] Int. Cl.$^5$ ............................................. H01R 9/07
[52] U.S. Cl. .................................. 439/494; 439/731; 439/422; 439/535
[58] Field of Search ............... 29/861, 868, 866, 867, 29/884; 439/492–499, 67, 77, 389–407, 417–419, 422, 535, 731

[56] References Cited

U.S. PATENT DOCUMENTS

| | | | |
|---|---|---|---|
| 3,275,968 | 9/1966 | McCaughey | 439/495 |
| 3,325,769 | 6/1967 | Travis | 439/498 |
| 3,462,542 | 8/1969 | Richter | 439/495 |
| 3,550,066 | 12/1970 | Cootes | 439/494 |
| 3,601,768 | 8/1971 | Lightner | 439/494 |
| 4,094,564 | 6/1978 | Cacolici | 439/494 |
| 4,674,819 | 6/1987 | Fujitani et al. | 439/498 |

Primary Examiner—David Pirlot
Attorney, Agent, or Firm—Eric J. Groen

[57] ABSTRACT

A transition block for interconnecting flat undercarpet power cable to round conductor power cable has stackable terminal blocks each having an electrical terminal mounted therein. The conductors of the multiconductor power cable can be separated and folded such that each cable is vertically aligned with the other. Insertion of the cable into the terminal blocks and forcing the terminal blocks together causes an insulation displacement portion within the terminal block to pierce the insulation of the flat cable. A poke through type terminal is mounted adjacent to, and electrically continuous with, the insulation displacement portion for electrically interconnecting flat cable to round cable. The assembled terminal blocks are profiled for installation within the standard wall mounted junction box.

26 Claims, 10 Drawing Sheets

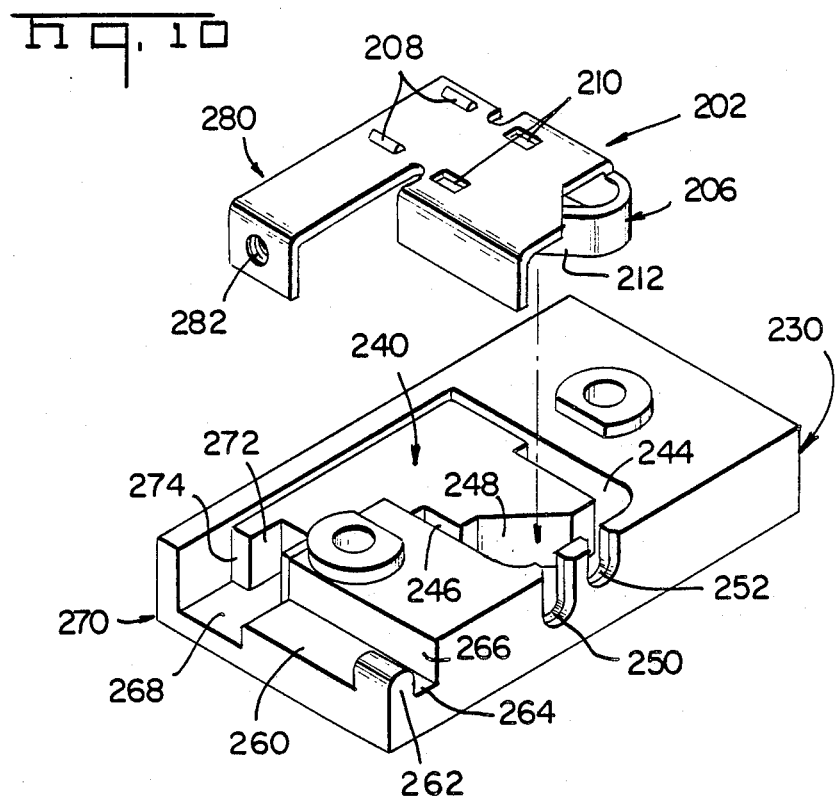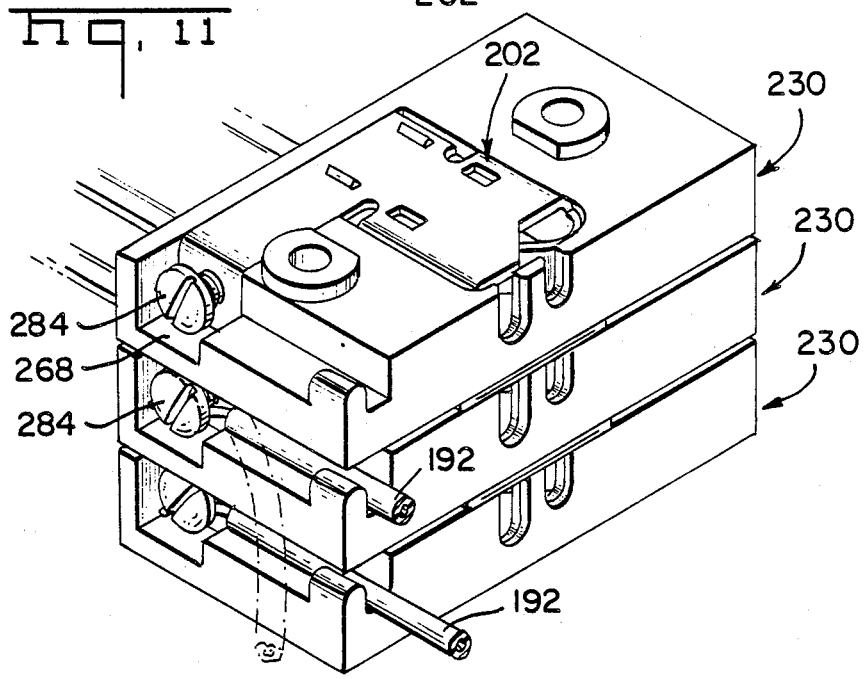

FLAT WIRE TO ROUND WIRE ELECTRICAL INTERCONNECT

This application is a continuation of application Ser. No. 06/898,969 filed Aug. 21, 1986, now abandoned.

BACKGROUND OF THE INVENTION

1. Field of the Invention

The instant invention relates to an electrical interconnect, for transitioning between round wire electrical power cable and flat conductor undercarpet power cable, profiled for installation and mounting to all standard electrical utility boxes.

2. Description of the Prior Art

The use of undercarpet cable is typically used in office buildings and the like where electrical power must be routed to local areas of the office such as modular office space, or cubicles, and local receptacles are installed there for local power. Round power cable is typically routed down through the walls and terminated within a junction box located just above the floor level. Undercarpet cable is then interconnected to the round power cable, via some type of transition member, and the transition member is installed in the junction box.

Undercarpet cable is virtually flat, typically on the order of 0.025 inch thick, and can carry either three or five conductors, although three conductors are more typical. Each conductor of the undercarpet cable is approximately 0.010 inches thick and ½ inch wide. The three conductors are then spaced apart in three elongate rows and insulative material is laminated or extruded over the conductors to comprise a cable assembly. As assembled the cable is typically on the order of three inches in width, and thus, any transition member which interconnects the undercarpet cable conductors to the round power cable conductors, due to the physical requirements of the transition member, is usually wider than the assembled undercarpet cable. Therefore, any junction box which is to house the transition member and the undercarpet cable will be on the order of at least 4 inches in width.

One prior art junction between flat cable and round wire is made along a flat transition member similar to that disclosed in U.S. Pat. No. 4,240,687. The junction box which encloses this transition member is, therefore profiled to accommodate the undercarpet flat cable and the flat termination member. This junction box is, therefore substantially larger and typically more expensive than standard junction used within the electrical industry. The requirement of having a specialized box for enclosing the terminated undercarpet cable detracts from the desirability of using the undercarpet cable.

Another prior art design utilizes a flat transition member but again the junction box must be large enough to accommodate the transition member and the undercarpet cable, therefore this transition member can only be installed in a four inch square junction box.

Still other flat undercarpet to round cable transition members are disclosed in U.S. Pat. Nos. 4,564,256; 4,240,687; 4,289,370; 4,387,949 and 4,446,330.

SUMMARY OF THE INVENTION

It is an object of the instant invention therefore to design an electrical termination device, for electrically interconnecting the flat undercarpet conductors to round conductors, which is profiled for mounting in standard electrical junction boxes, such as single gang switch boxes, four inch square boxes, flush mount boxes, and the like.

Other objects will be apparent from the disclosure which follows.

The instant invention accomplishes the above mentioned objective by arranging at least some of the flat conductors into an array of planes with at least one of the planes being distinct from the plane of the remaining cable, the device including means to electrically interconnect the flat power conductors with round conductors.

So arranged, the electrical interconnect of the instant invention can be installed in a junction box as small as a single gang box, which is dimensioned at 2 inches by 3 inches.

BRIEF DESCRIPTION OF THE DRAWINGS

FIG. 10 is a perspective view of a second alternate embodiment of the terminal of the electrical interconnect showing the terminal exploded away from the transition block.

FIG. 11 is a perspective view of the alternate embodiment of FIG. 10 in an assembled configuration.

DETAILED DESCRIPTION OF THE PREFERRED EMBODIMENT

Figure 1:
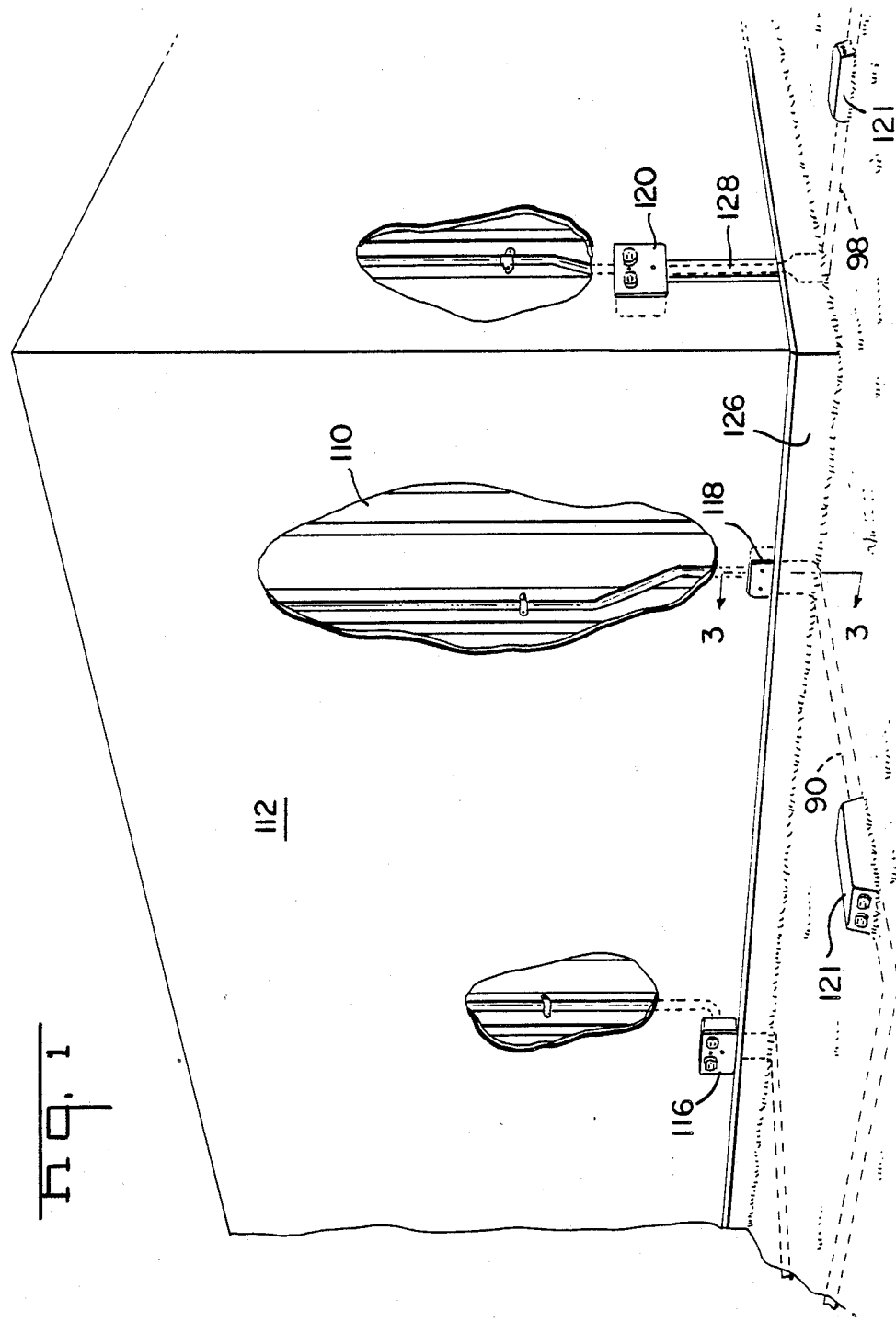
FIG. 1 is a perspective view of an office building wall showing various junction box configurations which can be used to house the transition member which interconnects the round wire to the flat undercarpet cable.

Referring now to FIG. 1, a typical office building is shown having round power cable fed down through the wall 112 via conduit 114 and transitioned to flat undercarpet cable 90. FIG. 1 also shows possible enclosures such as a surface mount junction box 116, a single gang box 118, or a four inch square box 120. The flat power cable 90 is routed down the wall from a junction box and then along the floor to a duplex receptacle 121. The undercarpet cable can then be covered by carpeting along the floor and by baseboards 126 along the wall. Undercarpet cable is common in office buildings, and the like, where modular offices and cubicles require local power receptacles. Undercarpet cable can be routed under the carpet and terminated to local receptacles at any place within an office room. The duplex receptacle 121 could be of the type shown in U.S. Pat. No. 4,463,998 or U.S. Pat. No. 4,479,692. The transition between round to flat wire has heretofore, been an expensive project requiring specially made utility boxes as the transition members, such as those shown in U.S. Pat. No. 4,240,687, are wider than the standard utility boxes. The electrical interconnect of the instant invention stackably interconnects multiconductor undercarpet power conductors with round conductors and can then be mounted within any standard utility box such as a single gang switch box, a single gang utility box, a single gang shallow switch box, a double gang insulated box or a four inch square box.

Figure 4:
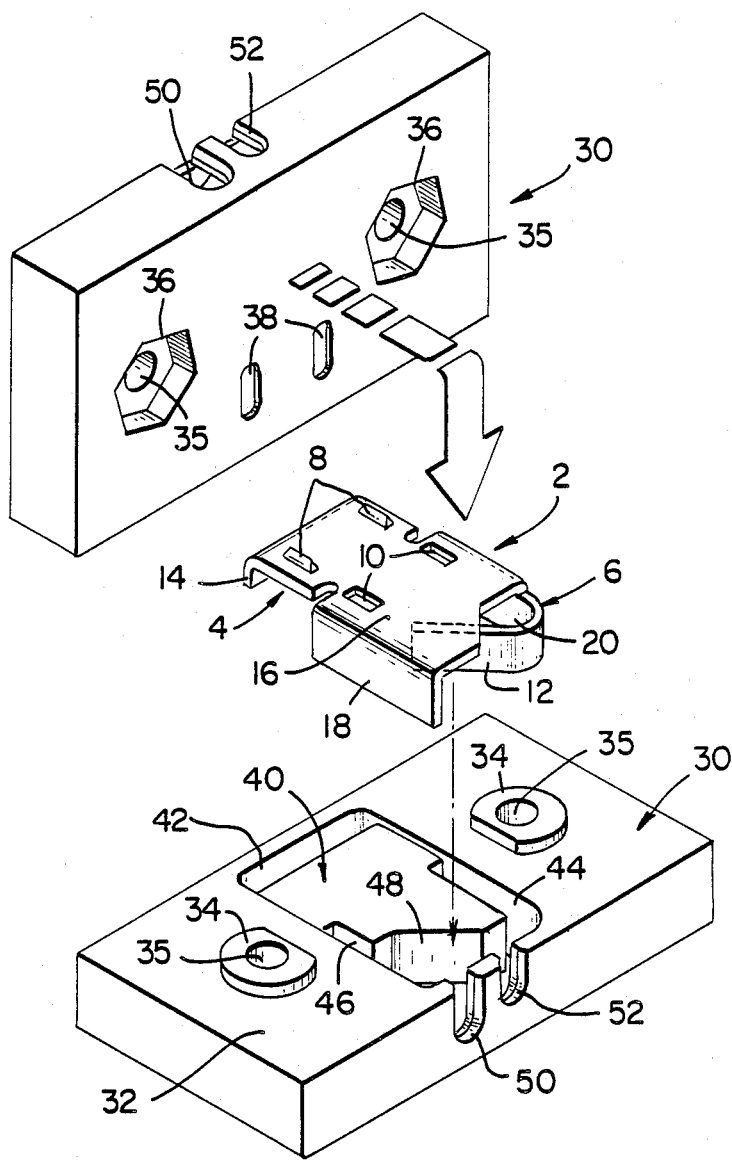
FIG. 4 is a perspective view of the electrical terminal exploded away from the block sections.
Figure 5:
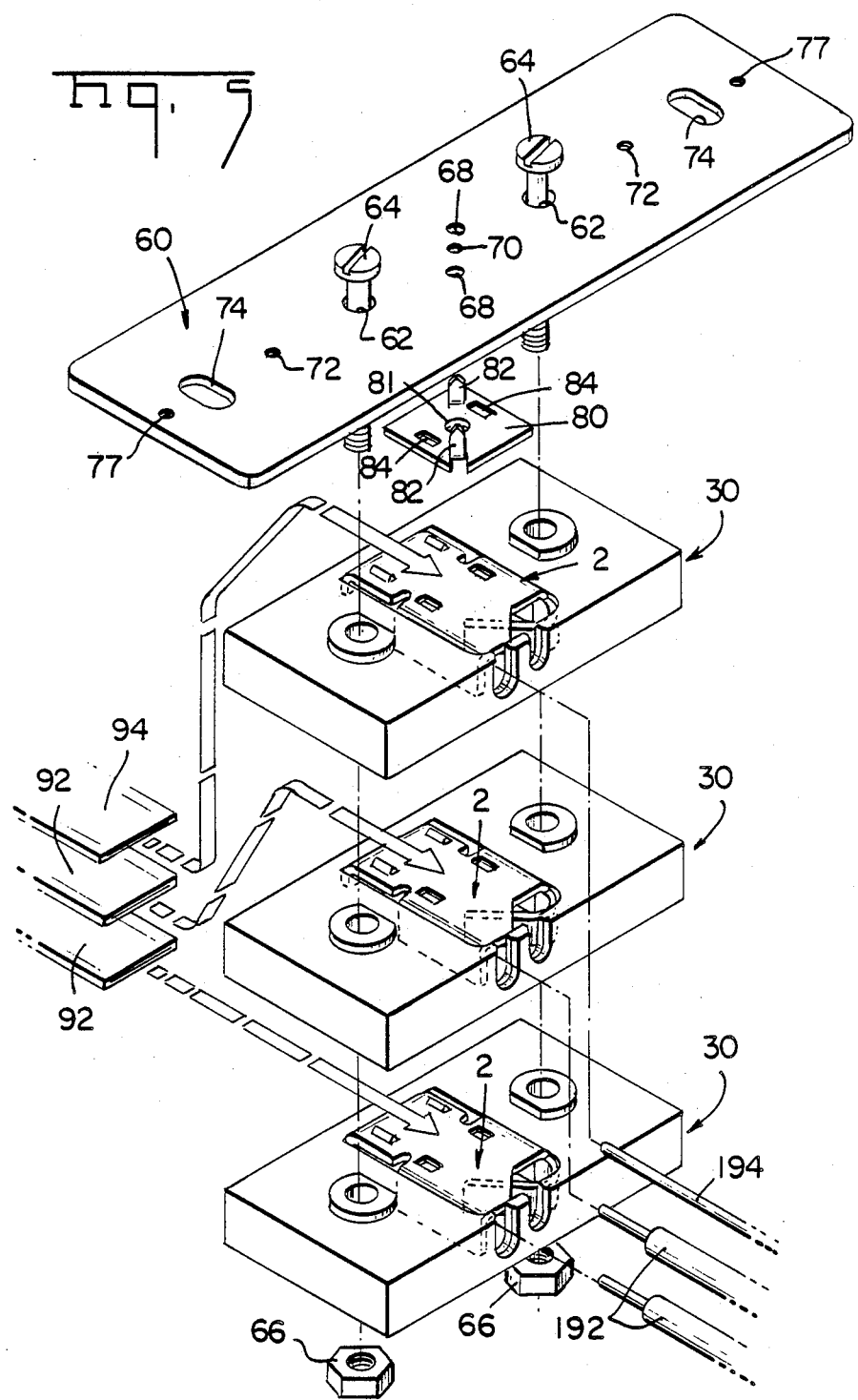
FIG. 5 is a perspective view showing the manner in which the flat conductor is stackable within the electrical interconnect and electrically interconnectable to the round wire conductors.

Referring now to FIG. 5, it can be seen that the electrical interconnect consists of three identical block members 30 constructed of an insulative material, and stacked one above the other. As best shown in FIG. 4, the electrical interconnect and the terminal are shown in greater detail. The terminal 2 consists of an insulation displacement portion 4 and a poke through type conductor terminating section 6, and is constructed of a flat plate portion 16 having side walls 18, 20 and an end wall 14. The insulation displacement portion 4 primarily consists of barbs 8 being stamped out from the opposite side of flat plate 16 in order that the barbs 8 stand upwardly from the flat plate portion 16. The round wire terminating section 6 consists of a spring finger 12 which is continuous with side wall 20 and bent around under the flat plate portion 16. The terminal 2 also consists of insulation receiving area 10.

The individual block sections 30 each include a flat plate section 32 with alignment bosses 34 upstanding therefrom. Each block 30 also includes a terminal receiving cavity shown generally as 40 which includes recessed sections 42, 44, 46, and 48. Surface 54 is also recessed from that of surface 32 by a distance approximately equal to the thickness of the terminal 2, such that when terminal 2 is inserted within the cavity 40, the surfaces 16 and 32 are substantially flush with each other. Each individual block 30 also includes a round wire entry 50 and a slot 52 for access to the spring finger 12 with a small blade screw driver or the like. The underside of each transition block 30 consists of hexagonal recesses 36 having through holes 35 therethrough, the through holes 35 also in alignment with the center of the alignment bosses 34. The underside of the electrical interconnect 30 further include insulation receiving sections 38.

Referring now to FIG. 5, the electrical interconnect assembly further comprises a grounding terminal 80 having lances 82 upstanding therefrom, a center hole 81 and barbs 84 stamped downwardly to face the opposing terminal 2. The assembly further comprises a mounting yoke 60 having a tapped center hole 70 and lance receiving holes 68. The strap also includes through holes 62 in alignment with the through holes 35 and tapped holes 72, slotted holes 74, and tapped holes 77.

Figure 6:
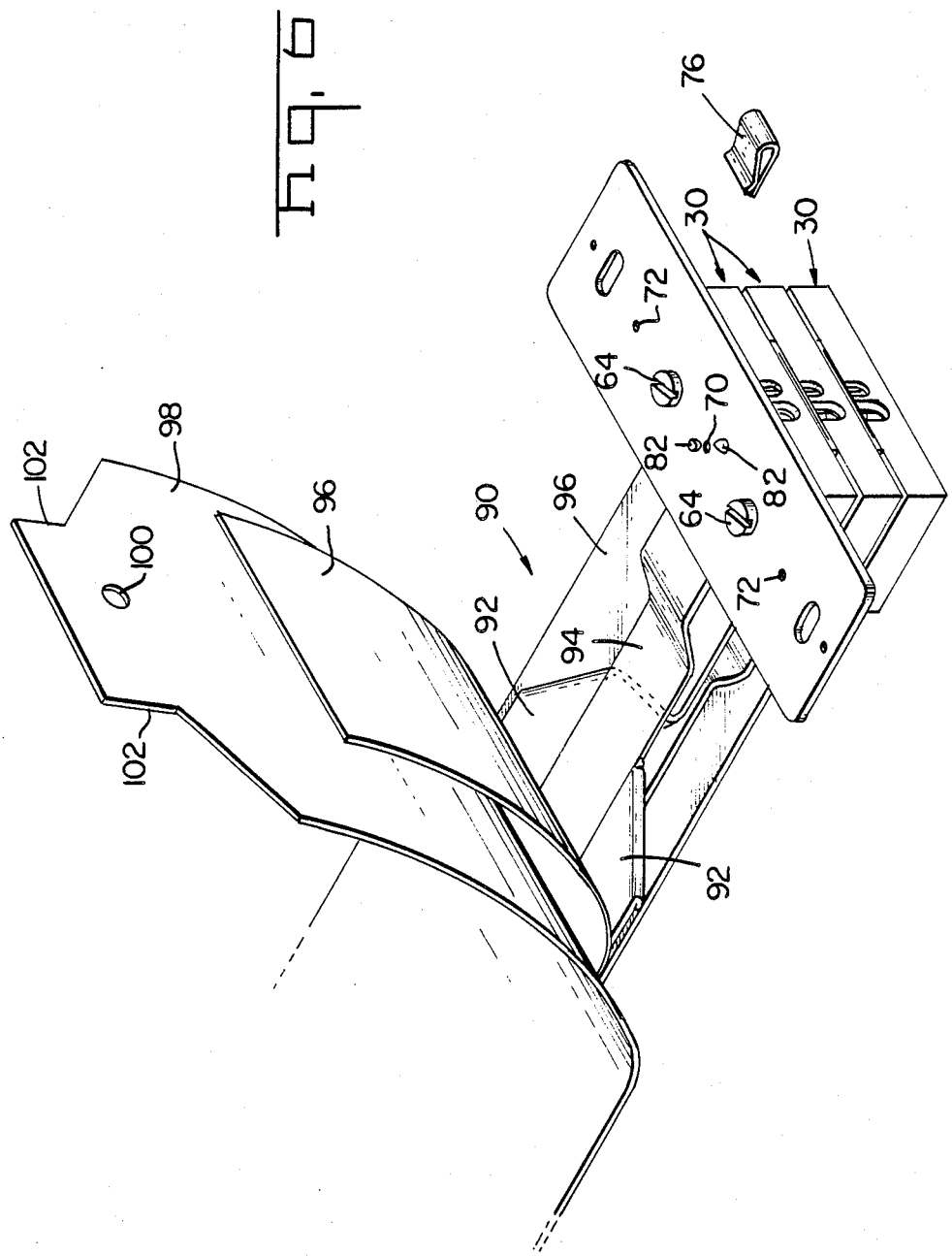
FIG. 6 is a perspective view showing the assembled flat conductors terminated within the electrical interconnect and the installation of the top shield over the flat cable.

Referring now to FIG. 6, the three conductor flat wire is shown as consisting of outer conductors 92 which are the power conductors and a center conductor 94 being a ground conductor. In order to longitudinally align the three conductors one above the other and with the center conductor, the preferred method of arranging the conductors is such that each outer power conductor 92 is folded at a 90 degree angle inwardly towards the center and then folded once again back upon itself so that each conductor is now aligned with the center ground conductor. Each flat conductor 92 and 94 may then be inserted between a terminal 2 and between the next consecutive terminal block 30 for interconnection to the terminal. The hexagonal recesses 36 in the underside of each terminal block 30 are profiled to fit over the alignment bosses 34 so that the three flat conductors may be inserted between the blocks and the blocks may be stacked one upon the other in substantial alignment thereto. In order to terminate the ground conductor 94 to a terminal 2, and thereafter common the ground conductor 94 to the electrical conduit 114, which will be described later, the ground conductor is placed between a terminal 2 and between a grounding terminal 80. The grounding terminal 80 is electrically connected to the mounting yoke 60 by lances 82 which are interconnected through holes 68 of the mounting strap. Once all flat conductors are in place and all blocks 30 are aligned one above the other, the clamping screws 64 may be inserted through the through holes 62 of the mounting yoke and inserted downwardly through the through holes 35 in the electrical interconnect and threaded onto nuts 66 which are captivated in the lower block. The nuts 66 will eventually reside in recesses 36 as the machine screws are threaded onto the nuts 66. As the screws 64 and nuts 66 are threaded, the barbs 8 on each terminal begin penetration through the insulation of the flat conductors and make electrical contact with the inner copper conductor. It should also be noticed that the ground conductor 94 is terminated between a terminal 2 and between a grounding terminal 80 which commons the ground conductor with the mounting yoke 60. It should also be noticed that each pair of barbs 8 on the terminals 2 are in substantial alignment with the recesses 38 on the underside of the blocks 30. This allows a relief area for the insulation which is displaced by the penetration of the barbs 8. In the case of the upper ground conductor 94, barbs 84 are in substantial alignment with recesses 10 which again allow a relief area for the insulation which is displaced by the barbs 84.

Interconnection between the flat conductors 92, 94 may now be made with the round conductors 192, 194. Each respective round wire 192, 194 is inserted through the round wire entries 50 interconnecting respective round conductors to the flat conductors 92, 94. Each round wire is resiliently held in place between the spring finger 12 and the inner surface of side wall 18.

Figure 2:
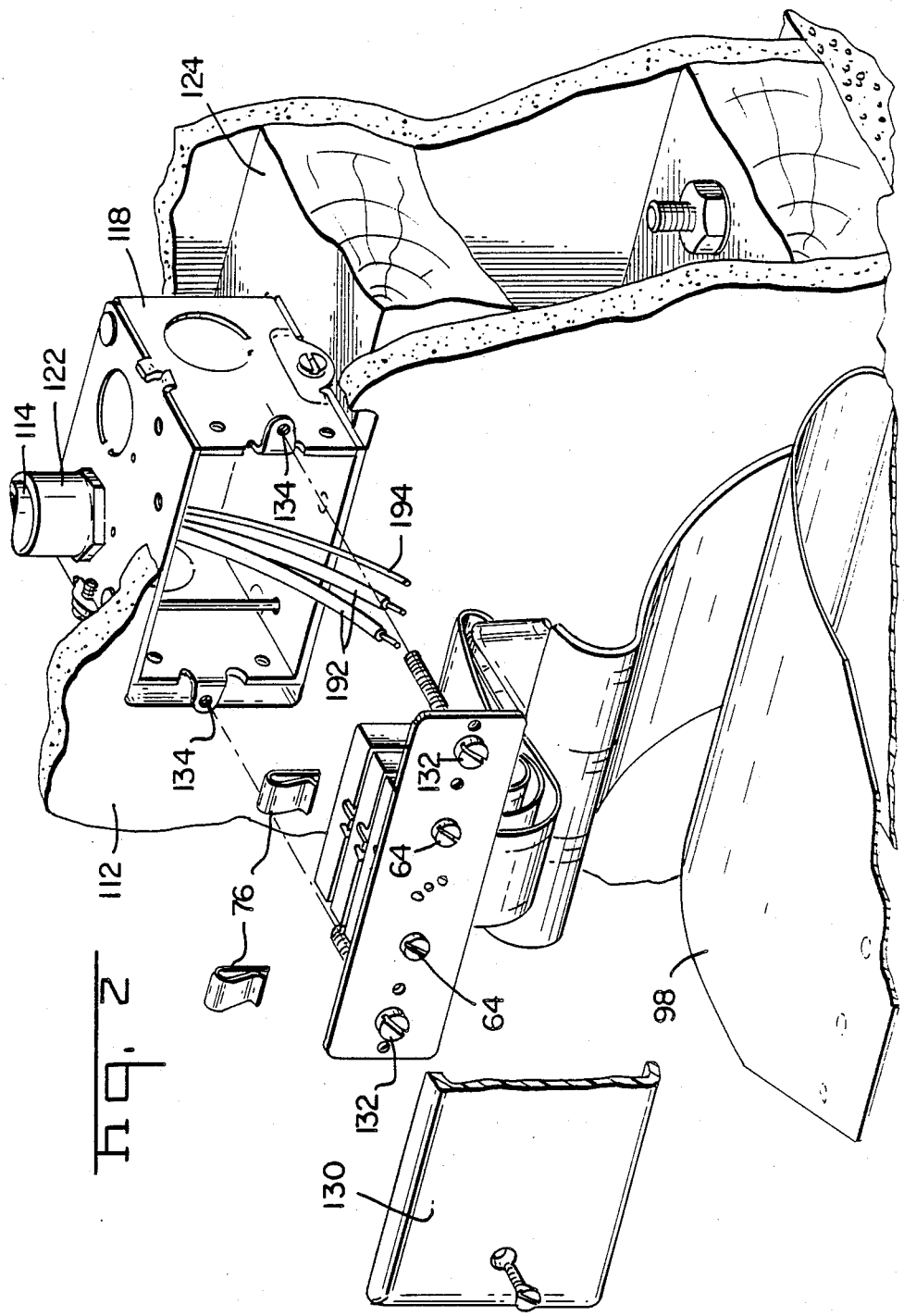
FIG. 2 is a perspective view of an office wall partially broken away to show the installed junction box with the electrical interconnect exploded away from the box.

As shown in FIG. 2, the assembled electrical interconnect may now be inserted into a standard utility box mounted within a wall, the box being shown as a single gang box 118. As designed, the width of the assembled transition blocks and cable be less than 2 inches, which will easily mount longitudinally within a single gang utility box, which is 2 inches by 3 inches. All electrical junction boxes have mounting holes 134 at a prescribed location and spacing for the optional mounting of a switch therein.

As shown in FIG. 2, the preferred method of installing the utility box 118 is to install the junction box horizontally so that the flat conductors are vertically aligned with the utility box 118. The slotted holes 134 are conveniently spaced apart at a precise distance for aligning with the holes 134 and for receiving machine screws 132 for mounting therein. If undercarpet cable is used in a building where existing junction boxes are installed vertically, the cable and electrical interconnect can be installed vertically up the wall and can then be bent at a 90 degree angle about itself to access the junction box from either side.

Figure 7:
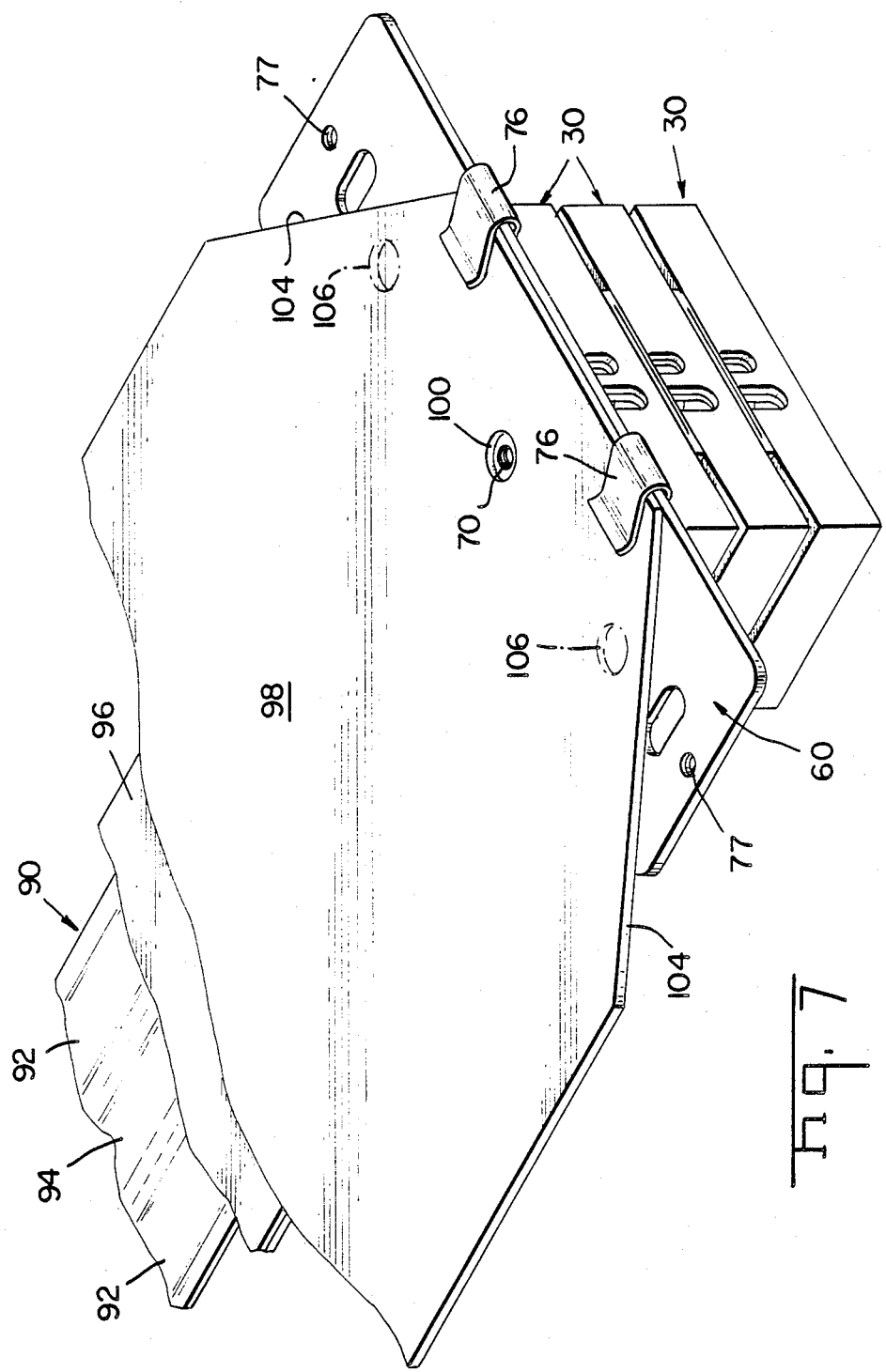
FIG. 7 is an alternate embodiment of the flat shield shown in FIG. 6.

Installation of undercarpet wiring also includes top shielding 98 being placed above the undercarpet wire directly below the carpeting. This shield 98, according to NEMA Standards, must also be commoned to both the mounting strap and to the conduit 114. The top shield 98 therefore is brought from the floor mounted duplex receptacle and brought towards the utility box 118 overlying the undercarpet wiring. The top shield 98 is then bent at the intersection of the wall and the floor and brought upwardly to the utility box as shown in FIG. 2. The top shield 98 is then secured to the mounting strap, as shown in FIG. 7 via clips 76. In order to retain access to the threaded holes 72 and 70, the top shield can either be formed as in FIG. 6 where the side edges 102 fit between the holes 72 with hole 100 overlying the center threaded hole 70 or the top shield 98 may include two further stamped holes 106 which access threaded holes 72, as shown in FIG. 7.

Figure 3:
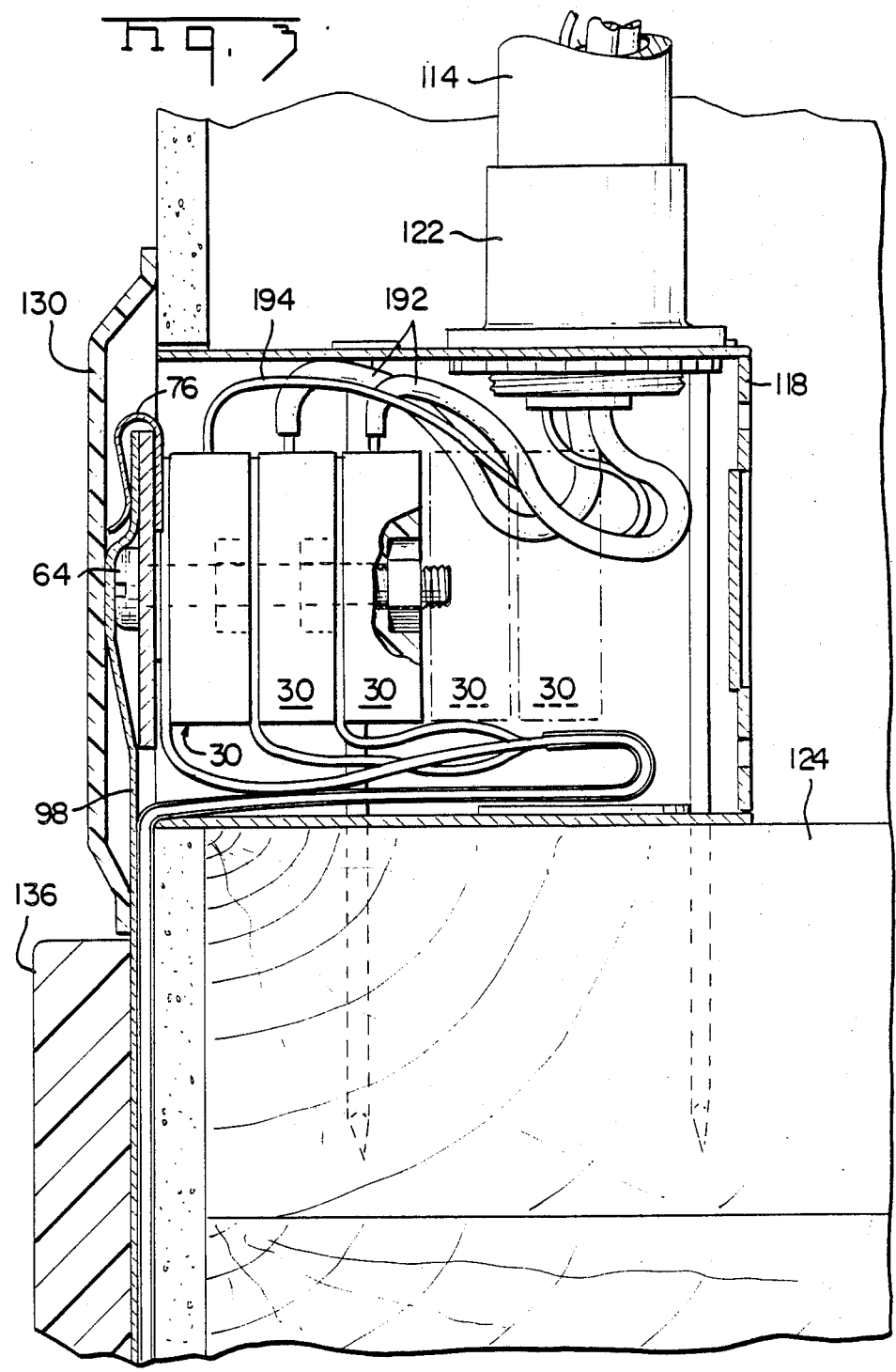
FIG. 3 is a cross sectional view through lines 3—3 of FIG. 1.

When the installation of the undercarpet cable and top shield is complete, the carpeting may be installed over the top shield and the baseboards 136 may be installed around the lower portion of the walls. As shown in FIG. 3, the preferred method of installing the utility box within the wall is to locate the box at a vertical distance above the floor just above the height of the baseboard 136 in order that the cover plate 130 may be installed over the box 118 and cover the box and the top shield 98. Installation of a cover plate just above the baseboard 136 will hide the top shield 98 providing a cosmetically appealing assembly.

The mounting yoke 60 is provided with various mounting possibilities which makes the use of the subject invention adaptable for use with NEMA standard mounting configurations. As mentioned above, slotted holes 74 are provided in the mounting plate for mounting the electrical interconnect to the junction box. All NEMA standard junction boxes include tapped holes, shown as 134 in FIG. 2, as part of the box on centers of approximately 3 9/32 of an inch. Thus the slotted holes 74 are profiled to fit over the tapped holes 134 for mounting the electrical interconnect thereto. The mounting strap also includes tapped hole 70 for mounting a cover plate thereto, the hole being centrally located for mounting a cover plate with a center hole, such as a cover for a single duplex receptacle. For example, if a single duplex receptacle is removed from a junction box and is replaced by the subject electrical interconnect the cover plate which was used to cover the receptacle may be reused by plugging the openings which access the duplex receptacles with standard plug members. The tapped holes 72 are provided for mounting other configurations of cover plates to the mounting strap, such as a single switch cover plate. For example, if a switch was removed from the junction box and replaced with the electrical interconnect, the cover may be reused by plugging the switch opening. Finally, the outer holes 77 are provided for mounting other configurations of cover plates thereto.

Although three conductor power cable is most typical, there are some situations in which five conductor cable is also required. FIG. 3 demonstrates in phantom that five block members are stackable within a single gang utility box for interconnection to five round power cables.

Figure 8:
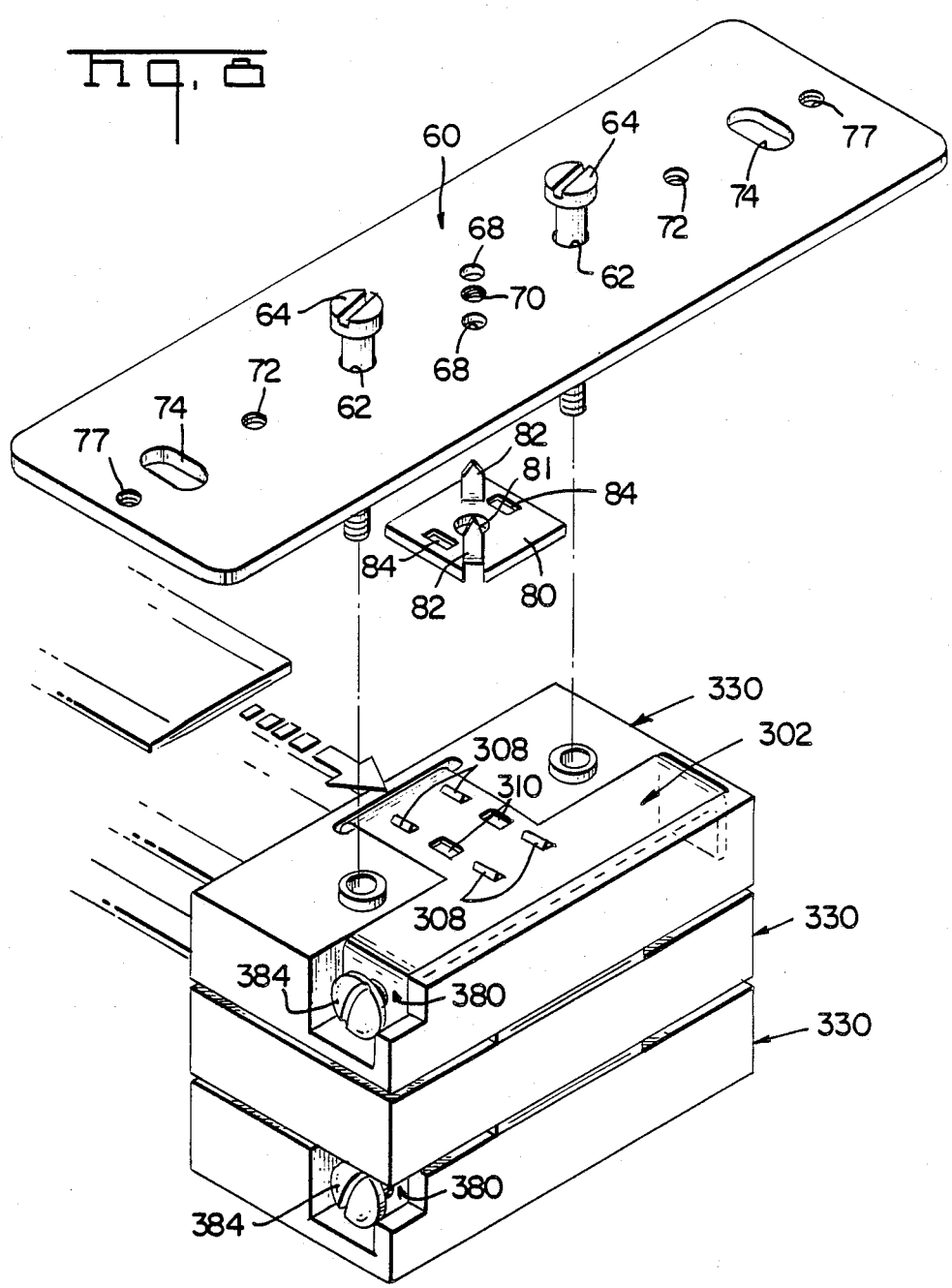
FIG. 8 is a perspective view of an alternate embodiment of the terminal of the electrical interconnect.
Figure 9:
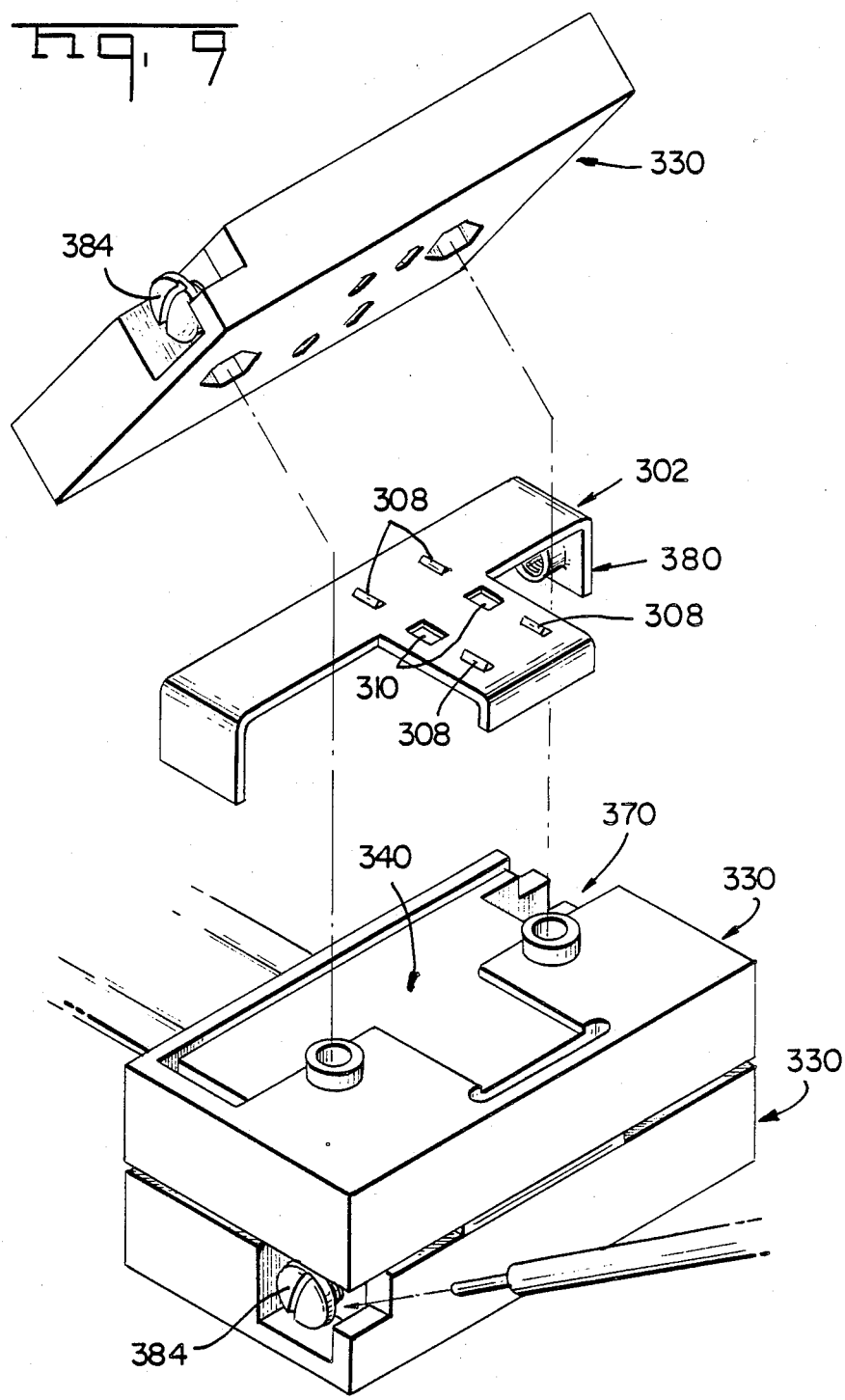
FIG. 9 is an exploded view of the alternate embodiment of FIG. 8.

Referring now to FIGS. 8 and 9, an alternate embodiment is shown as including a terminal portion 302 having a binding screw portion 380 and a screw 384. The terminal portion 380 would be recessed in a cavity 370 of the terminal block 330 to prevent inadvertent shorting between terminals. To further prevent inadvertent shorting the terminals would be rotated to position two terminals on one side and the third and middle terminal on the other side, as shown in FIG. 8. As shown in FIG. 8, the terminal 302 includes four barbs 308 to ensure an adequate penetration when the terminal and block are rotated.

As shown in FIGS. 10 and 11, a terminal can also comprise a poke through portion 206 and a binding screw portion 280. The poke through portion 206 would reside in the cavity 240 which is similarly dimensioned as the cavity portion 40 preferred embodiment. As best shown in FIG. 10, the binding screw portion is located in a cavity 270, adjacent wall 274 such that the threaded boss 282 aligns with the recess 272 allowing clearance for the threaded portion of the screw to enter. The embodiment shown in FIG. 10 further comprises a wire dress area 260 including surfaces 264, 266 and a wire restraint portion 262. As shown in FIG. 11 the wire 192 is placed in the dress area 260, between restraint 262 and surface 266, and lying adjacent to surface 264. The height of the threaded portion of the screw 284 with resect to the surface 264 causes the conductor to assume a position under the threaded portion as the wire is inserted. Furthermore, the tolerance between the head of the screw 284 and the surface 268 is such that the conductor is trapped under the head of the screw, alleviating the requirement of wrapping the conductor around the threaded portion of the screw prior to the termination. The conductor of wire 192 can also be inserted under the head of the screw without being in the wire dress portion, as shown in phantom in FIG. 11, then moved within the wire dress portion, the wire interferingly fitting between the top of the restraint 262 and the bottom of the adjacent block portion 230.

The subject invention is shown herein by way of specific embodiments only and should not be taken to limit the scope of the claims which follow.

What is claimed:

1. A transition block for interconnecting flat undercarpet power cable having a plurality of flat conductors arranged side-by-side in the same plane to round conductor power cable, the transition block comprising means for arranging at least some of the flat conductors into an array of planes separate from one another to decrease the width of the cable at the arranging means, at least one of said planes in said array being distinct from the plane of said flat cable, each arranging means including means for electrically interconnecting a flat power cable conductor to a round conductor, the arranging means comprising individual block members which carry individual electrical interconnection means, the block members being stackable one above the other and for trapping between them a flat power cable conductor, the transition block further comprising means to urge the block members together, effecting the electrical connection between the conductors and the individual electrical interconnection means, means to secure the block within an electrical utility box comprising a mounting yoke which is connectable to the transition block, the mounting yoke having mounting holes in alignment with threaded holes on the utility box, and the transition block further comprising means to common conduit carrying the round cable into the utility box to flat shielding which overlies the flat power cable and to a ground conductor.

2. The transition block of claim 1 wherein the commoning means comprises a terminal means mounted against the mounting strap to trap the ground conductor between the mounting strap and between an electrical interconnecting means.

3. The transition block of claim 2 further comprising means to electrically interconnect the flat shielding to the mounting yoke.

4. The transition block of claim 1 wherein the interconnection means comprises an electrical terminal having a flat cable terminating portion and a round wire terminating portion, the flat cable terminating portion comprising an insulation displacement portion, and the round wire terminating portion comprises a poke through terminating portion including a spring finger extending orthoginally towards a wall of the round wire terminating portion and resiliently biased towards the wall to trap the conductor between the wall and the finger.

5. The transition block of claim 4 wherein the round wire terminating portion comprises a binding screw member.

6. The transition block of claim 1 wherein the flat conductors are rearranged such that a width of the rearranged conductors is narrower than a width of the flat undercarpet power cable.

7. The transition block of claim 6 wherein the transition block and the rearranged conductors are profiled for lengthwise mounting within a single gang utility box.

8. The transition block of claim 6 further comprising means to mount the transition block and the rearranged cable into a single gang utility box lengthwise, the box being two inches in width and three inches in length.

9. A power distribution system for distributing incoming electrical power to local power receptacles mounted on the floor and located at various locations, the system comprising:
electrical cable having at least three round conductors located within a wall of a building carrying electrical power;
electrical conduit located within said wall carrying the electrical conductors therein;
an electrical junction box mounted within said wall and aligned with an opening in said wall, said box having at least one face opening outwards providing access to said box from outside of said wall, said electrical cable being routed into said junction box for electrical termination therein;
a floor mounted electrical receptacle having means for electrically connecting flat undercarpet cable thereto;
flat undercarpet cable having at least three flat conductors positioned in side-by-side registration within insulating material, the three conductors being positioned in a common plane having a predetermined side-to-side spacing, the three flat conductors being terminated to said electrical receptacle, said cable being routed to said junction box for electrical interconnection with said round conductors; and
a transition block for interconnecting the flat undercarpet cable to the round conductors, said block having means for arranging at least some of the flat conductors into an array of planes separate from one another to decrease the side-to-side spacing between adjacent flat conductors, at least one of said planes in said array being distinct from the plane of said flat cable, each arranging means including means for electrically interconnecting a flat power cable conductor to a round conductor.

10. The system of claim 9 further comprising flat metallic shielding overlying said undercarpet cable.

11. The system of claim 10 wherein the transition block further comprises mounting means to mount said block within the junction box.

12. The system of claim 11 wherein the mounting means comprises a mounting strap mechanically interconnectable to said transition block and electrically interconnectable to a ground cable of said flat undercarpet cable.

13. The system of claim 12 further comprising means to electrically common the metallic shielding and the ground cable of the flat undercarpet cable to the conduit.

14. A transition block assembly for interconnecting flat undercarpet power cable to round conductor power cable, the flat cable having at least three flat ribbon-like conductors in side-by-side spaced apart coplanar relationship, the conductors being contained in a flat band of insulating material, the transition block assembly comprising:
at least four housing plates which are stacked against each other, at least three of the housing plates being of insulating material, two of the plates being end plates and two of the plates being intermediate plates in the stack,
adjacent plates having a pair of opposed surfaces, at least three insulating plates, excepting one of the end plates, having a stamped and formed contacting and connecting means thereon, each contacting and connecting means having flat conductor contacting means at the surface of its respective plate for establishing electrical contact with a flat conductor and having connecting means for forming an electrical connection with a round wire, each pair of opposed surfaces having one contacting and connecting means associated therewith,
means for forcing the blocks tightly against each other and holding the blocks in assembled stacked relationship, whereby,
upon axially parting the band of insulating material between the conductors in an end portion of the flat cable, the flat conductors are separated from each other, and upon positioning each of the conductors between a pair of opposed surfaces on adjacent plates and in alignment with the contacting means of the associated contacting and connecting means, and upon thereafter forcing the blocks against each other, the contacting means will establish electrical contact with the flat conductors and round wires can thereafter be connected to the connecting means.

15. A transition block assembly as set forth in claim 14 characterized in that one of the end plates is a metal plate and the assembly is dimensioned for containment in a junction box with the metal plate against, and secured to, the junction box for grounding purposes, the insulating plates being identical to each other.

16. A transition block assembly as set forth in claim 14 characterized in that the contacting means of each contacting and connecting means comprises barb means which penetrate the insulation of a flat conductor when the plates are forced against each other.

17. A transition block assembly as set forth in claim 14 characterized in that the connecting means of each contacting and connecting means comprises a screw for making an electrical connection to a round wire.

18. A transition block assembly as set forth in claim 14 characterized in that the connecting means of each contacting and connecting means comprises a spring finger which is integral with its associated contacting and connecting means.

19. A connector assembly which is installed on one end of a flat conductor cable, the cable comprising at least three ribbon-like conductors in parallel side-by-side co-planar relationship, one of the conductors being a designated conductor, the conductors being contained in a flat band of insulating material, the connector assembly and the one end of the cable being characterized in that;

the insulating band is separated between each adjacent pair of conductors along parting lines which extend axially in the cable from the one end along a portion of the cable whereby the conductors have end portions which are separated from each other, the end portion of each of the conductors, except the designated conductor, is displaced laterally towards the designated conductor, the end portion of each conductor extending parallel to the end portion of the designated conductor in a plane which is parallel to, and spaced from, the plane of the designated conductor, the connector assembly comprises a housing having a conductor receiving side and has at least three pairs of opposed parallel conductor-receiving surfaces extending inwardly from the conductor-receiving side, the end portions of the conductors extending into the conductor-receiving side, each conductor being received between a pair of the conductor-receiving surfaces, and the housing has stamped and formed contacting and connecting means proximate to each opposed pair of surfaces, the contacting means being in electrical contact with the conductors, the connecting means having means for making connections to round wires.

20. A connector assembly as set forth in claim 19 characterized in that each of the laterally displaced conductors is displaced laterally by folds.

21. A connector assembly as set forth in claim 19 characterized in that each of the laterally displaced conductors is displaced laterally by first and second folds in the conductors, the first fold serving to direct the conductor laterally towards the designated conductor so that it extends transversely of the designated conductor, the second fold in each conductor serving to redirect the conductor so that it extends parallel to, and is in alignment with, the designated conductor in a plane which is parallel to, and spaced from, the plane of the designated conductor.

22. A connector assembly as set forth in claim 19 characterized in that the cable has three conductors therein and the designated conductor is a ground conductor.

23. A method of installing a connector assembly on one end of a flat conductor cable, the cable comprising at least three ribbon-like conductors in side-by-side co-planar relationship in a common plane, the conductors being contained in a flat band of insulating material, the method comprising the steps of:

axially parting the insulating material between each adjacent pair of conductors along a portion of the length of the cable extending from the one end thereof thereby separating the end portions of each of the conductors from each other, displacing the end portions of each of the separated conductors, except one designated conductor, laterally towards the one designated conductor, aligning the end portions of each of the separated and displaced conductors vertically with the one designated conductor in parallel spaced-apart planes with one conductor occupying each plane, with at least one of the separated conductors being above and one of the other separated conductors being below, the one designated conductor, thereby forming a column of vertically aligned individual conductors, assembling a connector, which requires that the conductors be in parallel spaced-apart planes, to the ends of the spaced apart aligned conductors.

24. A method as set forth in claim 23 characterized in that the connector is assembled to the ends of the conductors by clamping the ends of the conductors between opposed surfaces of a stack of plates.

25. A method as set forth in claim 24 characterized in that the conductors, except the designated conductor, are displaced laterally towards the designated conductor by folding the conductor.

26. A method as set forth in claim 25 characterized in that the folding of the conductors is carried out by forming first and second folds in each of the conductors except the designated conductor, the first fold in each conductor serving to direct the conductor laterally towards the designated conductor so that it extends transversely of the designated conductor, the second fold serving to redirect the conductor so that it extends parallel to, and is in alignment with, the designated conductor in a plane which is parallel to, and spaced from, the plane of the designated conductor.

* * * * *